United States Patent
Lommerts et al.

(10) Patent No.: US 9,045,624 B2
(45) Date of Patent: Jun. 2, 2015

(54) STORAGE STABLE EMULSIONS FROM LOW PENETRATION GRADE BITUMINOUS BINDERS

(75) Inventors: Bert Jan Lommerts, Heerhugowaard (NL); Irina Manuela Cotiuga, Utrecht (NL); Harriet Passies, Vinkeveen (NL)

(73) Assignee: LATEXFALT B.V. (NL)

( * ) Notice: Subject to any disclaimer, the term of this patent is extended or adjusted under 35 U.S.C. 154(b) by 404 days.

(21) Appl. No.: 13/496,305

(22) PCT Filed: Sep. 16, 2010

(86) PCT No.: PCT/NL2010/050599
§ 371 (c)(1),
(2), (4) Date: Jun. 4, 2012

(87) PCT Pub. No.: WO2011/034425
PCT Pub. Date: Mar. 24, 2011

(65) Prior Publication Data
US 2012/0244278 A1  Sep. 27, 2012

Related U.S. Application Data

(60) Provisional application No. 61/243,302, filed on Sep. 17, 2009.

(30) Foreign Application Priority Data

Sep. 17, 2009  (EP) .................................... 09170585

(51) Int. Cl.
| | | |
|---|---|---|
| *C08L 95/00* | (2006.01) |
| *C08L 5/00* | (2006.01) |
| *B05D 1/00* | (2006.01) |
| *B05D 7/24* | (2006.01) |
| *C08L 91/00* | (2006.01) |
| *C08L 101/00* | (2006.01) |
| *B01F 17/00* | (2006.01) |

(52) U.S. Cl.
CPC ...... *C08L 5/00* (2013.01); *B05D 1/00* (2013.01); *B05D 7/24* (2013.01); *C08L 91/00* (2013.01); *C08L 95/00* (2013.01); *C08L 95/005* (2013.01); *C08L 101/00* (2013.01); *B01F 17/005* (2013.01)

(58) Field of Classification Search
None
See application file for complete search history.

(56) References Cited

U.S. PATENT DOCUMENTS

| | | | | |
|---|---|---|---|---|
| 5,246,986 A | * | 9/1993 | Pierre et al. ...................... 524/68 |
| 5,382,612 A | * | 1/1995 | Chaverot et al. ................. 524/60 |
| 5,750,598 A | * | 5/1998 | Krivohlavek et al. ........... 524/71 |

FOREIGN PATENT DOCUMENTS

| | | |
|---|---|---|
| EP | 0 370 911 A1 | 5/1990 |
| EP | 0 425 380 A1 * | 5/1991 |
| EP | 0 652 259 A1 | 5/1995 |
| FR | 2 727 699 A1 | 6/1996 |
| WO | 2009/113854 A1 | 9/2009 |

* cited by examiner

Primary Examiner — William Phillip Fletcher, III
(74) Attorney, Agent, or Firm — Edmonds & Nolte, P.C.

(57) ABSTRACT

The present invention relates to emulsions comprising a $(1\rightarrow 3)$-β-D-glucan, a cationic emulsifier and a bituminous binder having a low penetration. The emulsion is storage stable while fast breaking, even under unfavorable environmental conditions such as high humidity and low temperature. The emulsions can conveniently be used in chip less surface dressings, trackless tack coating compositions, waterproofing compositions, flooring applications, bonding layers, impregnation layers, dense coated materials and semi-dense coated materials which are cold-cast or storable, slurry seals, micro-surfacing compositions and mortars.

20 Claims, No Drawings

STORAGE STABLE EMULSIONS FROM LOW PENETRATION GRADE BITUMINOUS BINDERS

CROSS-REFERENCE TO RELATED APPLICATIONS

This application is a United States National Phase Application of International Patent Application No. PCT/NL2010/050599, filed on Sep. 16, 2010, which claims priority to EP Patent Application No. 09170585.5, filed on Sep. 17, 2009, and U.S. Provisional Patent Application having Ser. No. 61/243,302, filed on Sep. 17, 2009, all of which are incorporated by reference herein.

FIELD OF THE INVENTION

The present invention relates to emulsions comprising a (1→3)-β-D-glucan, a cationic emulsifier and a bituminous binder having a low penetration. The emulsion is storage stable whilst fast breaking, even under unfavourable environmental conditions such as high humidity and low temperature. The emulsions can conveniently be used in chip less surface dressings, trackless tack coating compositions, water-proofing compositions, flooring applications, bonding layers, impregnation layers, dense coated materials and semi-dense coated materials which are cold-cast or storable, slurry seals, micro-surfacing compositions and mortars.

BACKGROUND OF THE INVENTION

Low penetration grade bitumen (also known as hard bitumen) is very difficult to emulsify as is well known in the art. The harder the bitumen, the lower the needle penetration value and the higher the softening point, but also the more difficult it becomes to emulsify the bitumen into storage stable, fast breaking emulsions. Low storage stability is reflected in a fast rate of separation of a water-rich upper layer and a bitumen-rich lower layer when a bituminous emulsion is stored at room temperature under quiescent conditions. The difference in water content between the layers formed is the value for the so-called storage stability, which is determined according to standard method NEN-EN 12847. Hence, the lower the value of this difference, the better the storage stability is and a value of zero indicates perfect storage stability. The storage stability is often expressed in a percentage and to obtain such percentages, the values must be multiplied by 100%.

Slow breaking of an emulsion is reflected in a long time before a solid film is formed after application of the emulsion to the road surface. It is well accepted in the art that the breaking index, or sometimes also called filler index, is a good measure for the time to break after application to a road surface. A high breaking index implies slow breaking. The breaking index is usually determined according to standard method NEN-EN 13075-1.

Storage stability can be improved by adding more emulsifier to the aqueous phase prior to emulsification. However, although improved storage stability is achieved, the breaking index also increases significantly which is obviously not desired.

A further advantage of emulsions having a low breaking index value is that these emulsions will also break relatively quickly under humid and cold conditions allowing the product to be used under less favourable environmental conditions.

U.S. Pat. No. 5,246,986 of Elf France, incorporated by reference herein, discloses an emulsion of a bituminous binder wherein a thickening agent is employed that contains at least 40% by weight of scleroglucan, wherein it is preferred that the aqueous phase of the emulsion comprises 100 to 5000 ppm, preferably 200 to 2000 ppm of scleroglucan. Examples 2 and 4 discloses cationic emulsions comprising bitumen having a penetration of 180-220 $10^{-1}$ mm and scleroglucan of a technical grade (which consists of 70 wt. % of scleroglucan and 30 wt. % of biomass), wherein the scleroglucan (calculated on actual scleroglucan content) is 0.021 wt. %. The penetration was determined according to NF Standard T 66004 which is equivalent to ASTM D5-97 (cf. C. Garrigues and P. Vincent, "Sulfur/Asfalt binders for Road Construction", "New uses of Sulfur", Chapter 8, pages 130-153, 1975; DOI 10.1021/ba-1975-0140.ch008, *Advances in Chemistry*, Vol. 140, ISBN13: 9780841202184, eISBN: 9780841223219).

GB A 2452903 of Colas S. A., incorporated by reference, discloses an emulsion comprising an aqueous phase and an organic phase comprising a binder composition, wherein the binder composition comprises bitumen and a non-aromatic polymer, in particular polyisoprene. The emulsion is preferably cationic. The bitumen has preferably a penetration of 50 to 150 $10^{-1}$ mm. The emulsion is rapidly breaking as indicated by a breaking index (according to NFT 66-017 (tentative French National Standard December 1983) of 45-100. The emulsion preferably comprises 45-75 wt. % of the binder composition, based on the total weight of the emulsion.

WO 2009/113854 of Latexfalt B.V., incorporated by reference herein, discloses emulsions comprising a (1→3)-β-D-glucan, preferably scleroglucan, a biodegradable emulsifier which may be non-ionic or cationic, and bitumen. The bitumen have a penetration in the range of about 10 to about 350 $10^{-1}$ mm according to ASTM D5-97, more preferably about 70 to about 220 $10^{-1}$ mm.

As explained above, there is a need in the art for emulsions having excellent storage stability which are fast breaking. In particular, there is a need in the art for such emulsions which incorporate low penetration bitumen (also known as hard bitumen).

SUMMARY OF THE INVENTION

The present invention relates to an emulsion comprising a (1→3)-β-D-glucan, a cationic emulsifier and a bituminous binder having a penetration of less than 70 $10^{-1}$ mm according to ASTM D5-97. The present invention further relates to the use of the emulsion in various end-applications including chip less surface dressings, trackless tack coating compositions, water-proofing compositions, flooring applications, bonding layers, impregnation layers, dense coated materials and semi-dense coated materials which are cold-cast or storable, slurry seals, micro-surfacing compositions and mortars.

DETAILED DESCRIPTION OF THE INVENTION

The verb "to comprise" as is used in this description and in the claims and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there is one and only one of the elements. The indefinite article "a" or "an" thus usually means "at least one".

The term "emulsion" is to be understood as a system in which liquid droplets and/or liquid crystals are dispersed in a liquid. In emulsions the droplets often exceed the usual limits for colloids in size. An emulsion is denoted by the symbol O/W if the continuous phase is an aqueous solution and by W/O if the continuous phase is an organic liquid (an "oil"). More complicated emulsions such as O/W/O (i.e. oil droplets contained within aqueous droplets dispersed in a continuous oil phase or three-phase emulsions) are also included by the term "emulsion". Photographic emulsions, although colloidal systems, are not emulsions in the sense of the term "emulsions" as used in this document (cf. International Union of Pure and Applied Chemistry, Manual of Symbols and Terminology for Physiochemical Quantities and Units, Appendix II, Definitions, Terminology, and Symbols in Colloid and Surface Chemistry, Part 1, web version 2001). The type of emulsion (O/W or W/O) is determined by the volume ratio of the two liquids. For example, with 5% water and 95% oil (an O/W phase ratio of 19), the emulsion is usually W/O.

In this document, "hard" bitumen is to be understood as a bitumen having a penetration of about 10 to about 100 $10^{-1}$ mm according to ASTM D5-97. On the other hand, "soft" bitumen is to be understood as having a penetration of about more than about 100 to about 350 $10^{-1}$ mm according to ASTM D5-97. As is well known in the art, the unit for penetration according to ASTM D5-97 is "$10^{-1}$ mm".

The (1→3)-β-D-glucan

As is known in the art, (1→3)-β-D-glucans may have different types of linkages. According to the invention, it is preferred that the (1→3)-β-D-glucan has also (1→6)-β-D-linkages. It is also preferred that the polymer has glucopyranose side chains.

According to the present invention, it is preferred that the (1→3)-β-D-glucan is a non-modified (1→3)-β-D-glucan.

According to the invention, the glucan is selected from the group consisting of scleroglucan (CAS No. 39464-87-4), schizophyllan (CAS No. 9050-67-3), laminaran (CAS No. 9008-22-4), cinerean, lentinan (CAS No. 37339-90-5) and curdlan (CAS No. 54724-00-4). However, curdlan is less preferred because of its low water solubility at acidic pH. Most preferably, the glucan is scleroglucan.

Suitably, the glucan is used in an admixture with an oil, preferably vegetable oil, more preferably a food grade vegetable oil, to protect glucan particles to conglomerate when they are contacted with an aqueous medium.

The Cationic Emulsifier

Cationic emulsifiers are well known in the art. Preferred emulsifiers are selected from the group consisting of quaternary amines, quaternary amino-amines and quaternary imidazolines. Quaternary amines include products such as diquaternary amines, e.g. the Redicote® products manufactured by AkzoNobel. A particularly preferred group of such cationic emulsifiers are derived from amines having the formula:

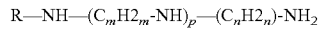

wherein R is a $C_1$-$C_{30}$ aliphatic group, m is an integer in the range from 1 to 8, p is an integer in the range of 0 to 6, and n is an integer in the range of 1-8. Another particularly preferred group of such cationic emulsifiers are derived from amidoamines having the formula:

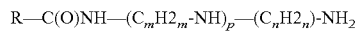

wherein R is a $C_1$-$C_{30}$ aliphatic group, m is an integer in the range from 1 to 8, p in an integer in the range of 0 to 6, and n is an integer in the range of 1-8.

Imidazoline emulsifiers may for example be obtained by heating aminoamines as is for example disclosed in U.S. Pat. No. 5,352,285, incorporated by reference.

Yet another particularly preferred group of cationic emulsifiers are biodegradable emulsifiers. These biodegradable emulsifiers are preferably selected from the group consisting of alkylpolyglycosides according to formula (I), betaine glycines according to formula (II) and choline esters according to formula (III). These biodegradable emulsifying agents are disclosed in more detail below.

U.S. Pat. No. 6,117,934, incorporated by reference herein, discloses the non-ionic emulsifying agents of the group of alkylpolyglycosides of formula (I):

wherein $R^1$ is an alkyl group having 5 to 24 carbon atoms, $R^2$ is an alkylene group having 2 to 4 carbon atoms and Z is a saccharide group having 5 or 6 carbon atoms, b is an integer having a value of 0 to 12 and a is an integer having a value of 1 to 6. Preferably, b is 0 and Z is a glucose residue. The alkyl group is preferably linear and may optionally contain up to three carbon-carbon double bonds. As is disclosed in U.S. Pat. No. 6,117,934, the number of saccharide groups, i.e. a, is a statistical mean value.

Betaine has the formula $Me_3N^{(+)}$—$CH_2$—$COO^{(-)}$. In the art quaternary $N^{(+)}$—$(CH_2)_n$—$X^{(-)}$ compounds (i.e. combinations of a cationic group and an anionic group at close distance from each other within one molecule are generally called "betaines", wherein $X^{(-)}$ is an anion, e.g. a halide, a sulfonate or a phosphonate. However, since N-quaternised glycine ($H_2N$—$CH_2$—$COOH$) is betaine, compounds having the formula $Me_3N^{(+)}$—$CH_2$—$COOR$ are in this document indicated as "betaine esters" or "betaine ester derivatives", despite the fact that they lack an anionic group.

Choline has the formula $Me_3N^{(+)}$—$CH_2$—$CH_2$—$OH$ and the esters thereof are in this document indicated as "choline esters" or "choline ester derivatives".

US 2007/0243321, incorporated by reference herein, discloses cationic emulsifying agents of the group of betaine esters of formula (II):

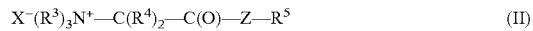

wherein X is a sulphonate group, $R^3$ is a linear or branched alkyl group having 1 to 6 carbon atoms, $R^4$ is either hydrogen or a linear or branched alkyl group having 1 to 6 carbon atoms, Z is either O or NH, and $R^5$ is a group having the formula $C_nH_{2(2n-m)+1}$, wherein m denotes the number of carbon-carbon double bonds, with 6≤n≤12 and 0≤m≤3. If the alkyl group comprises 3-6 carbon atoms, it may also have a cyclic structure and may include one to two heteroatoms selected from the group of nitrogen and oxygen.

Other betaine esters of formula (II) include (not disclosed in US 2007/0243321) those compounds wherein X is an anion other than a methane sulphonate, a paratoluene sulphonate or a camphor sulphonate anion, e.g. a halide, preferably chloride.

US 2005/0038116, incorporated by reference herein, discloses $CH_3$—$(CH_2)_{17}$—$C(O)$—$O$—$(CH_2)_2$—$^+N(CH_3)_3Cl^-$ (stearoyl choline chloride) and its use for the treatment of certain diseases. This compound can also be used as an emulsifier according to the present invention.

WO 2006/066643, incorporated by reference herein, discloses esters of choline and fatty acids and cosmetic products comprising such esters. The esters are said to have bactericide activity and have the formula R—C(O)—O—$(CH_2)_2$—$^+N(CH_3)_3X^-$, wherein R is a $C_6$-$C_{36}$ alkyl group and $X^-$ is a halogenide, nitrate, phosphate, tosylate or methanesulphonate. Also these esters can be used as an emulsifier according to the present invention.

Another group of cationic emulsifiers are the group of choline ester derivatives of formula (III):

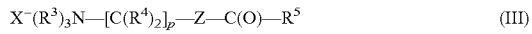

$$X^-(R^3)_3N-[C(R^4)_2]_p-Z-C(O)-R^5 \quad (III)$$

wherein $X^-$ is a counter ion, e.g. a sulphonate group or a halide, $R^3$ is a linear or branched alkyl group having 1 to 6 carbon atoms, p is 1 or 2 (preferably 2), $R^4$ is either hydrogen or a linear or branched alkyl group having 1 to 6 carbon atoms, Z is either O or NH, and $R^5$ is a group having the formula $C_nH_{2(2n-m)+1}$, wherein m denotes the number of carbon carbon double bonds, with $6 \leq n \leq 12$ and $0 \leq m \leq 3$, or a group having the formula $C_nH_{2n+1}$, wherein $1 \leq n \leq 24$. If the alkyl group comprises 3-6 carbon atoms, it may also have a cyclic structure and may include one to two heteroatoms selected from the group of nitrogen and oxygen. When X— is a sulphonate, it is preferred that X— is a $C_1$-$C_{12}$ monoalkyl sulphonate, wherein the alkyl group may be linear or branched and/or may optionally be interrupted by one or more hetero-atoms selected from O and N. If $X^-$ is a halide, it can in principle be $F^-$, $Cl^-$, $Br^-$ or $I^-$. However, it is preferred that $X^-$ is $Cl^-$.

The Bituminous Binder

The bitumen employed in the emulsions of the present invention may either be straight run products or processed products (cf. Kirk-Othmer, Encyclopedia of Chemical Technology, 4th Ed., Vol. 3, pages 689-724).

According to the present invention, the bituminous binder has a penetration of less than $70 \cdot 10^{-1}$ mm according to ASTM D5-97, preferably less than $65 \cdot 10^{-1}$ mm, more preferably less than $60 \cdot 10^{-1}$ mm and most preferably $55 \cdot 10^{-1}$ mm or less. It is furthermore preferred that the bituminous binder has a penetration of more than $10^{-1}$ mm, more preferably $15 \cdot 10^{-1}$ mm or more and most preferably $20 \cdot 10^{-1}$ mm or more. Well known penetration grades include 20/30, 35/50 and 40/60.

According to the present invention, the bitumen may comprise a blend of bitumen having different penetration grades, provided that the blend has a penetration of less than $70 \cdot 10^{-1}$ mm according to ASTM D5-97. According to a preferred embodiment, the bitumen comprises a blend of a soft bitumen, i.e. a soft bitumen having a penetration of more than about $100 \cdot 10^{-1}$ mm according to ASTM D5-97, preferably more than about 100 or about $350 \cdot 10^{-1}$ mm, more preferably of more than about 100 to about $220 \cdot 10^{-1}$ mm, even more preferably about 160 to about $220 \cdot 10^{-1}$ mm, and a hard bitumen, i.e. a hard bitumen having a penetration of about $100 \cdot 10^{-1}$ mm or less according to ASTM D5-97, preferably about 100 or less to about $10 \cdot 10^{-1}$ mm, more preferably of about 60 to about $10 \cdot 10^{-1}$ mm, even more preferably about 50 to about $20 \cdot 10^{-1}$ mm. The blend preferably comprises a weight ratio of a soft bitumen to a hard bitumen in the range of 1 to 30, more preferably in the range of 1 to 10.

According to an embodiment the present invention, it is preferred that the bituminous binder is selected from the group consisting of paraffinic and naphtenic bitumen.

Further Components

The emulsions according to the present application further preferably comprise an elastomer and/or a petroleum resin and/or a natural resin. The addition of an elastomer and/or a petroleum resin and/or a natural resin has the advantage that life of the road surface coated with the emulsion according to the present invention is enhanced. Elastomers, petroleum resins and natural resins are also beneficial for the flexibility of the coated road surface. The addition of an elastomer and/or a petroleum resin and/or a natural resin further reduces the temperature dependence of visco-elastic properties.

According to the present invention, the elastomer is preferably selected from the group consisting of ethylene-vinyl acetate copolymers, polybutadienes, polyisoprenes, ethylene-propylene copolymers, ethylene-propylene-diene copolymers, styrene-ethylene-butadiene-styrene copolymers, styrene-propylene-butadiene-styrene copolymers, butadiene-styrene diblock copolymers, styrene-butadiene styrene triblock copolymers, isoprene-styrene diblock copolymers, styrene-isoprene-styrene triblock copolymers, wherein the diblock or triblock copolymers may occur in morphological shapes as star-shaped polymers wherein a cross-linking agent such as divinyl benzene is employed in the manufacturing process. However, according to the present invention, it is preferred that the elastomer is a polymer comprising two adjacent, optionally substituted butadiene units such as isoprene, most preferably a polybutadiene, a polyisoprene, a styrene-ethylene-butadiene-styrene copolymer, a styrene-propylene-butadiene-styrene copolymer, a butadiene-styrene diblock copolymer, a styrene-butadiene-styrene triblock terpolymer, a isoprene-styrene diblock copolymer or a styrene-isoprene-styrene triblock terpolymer. More preferably, the elastomer is a polybutadiene, a polyisoprene, a styrene-ethylene-butadiene-styrene copolymer, a styrene-propylene-butadiene-styrene copolymer or a styrene-butadiene-styrene triblock terpolymer. According to another preferred embodiment of the present invention, the elastomer is an ethylene-vinyl acetate copolymer.

The petroleum resin is preferably selected from the group consisting of resins manufactured by polymerisation of unsaturated hydrocarbons present in unsaturated petroleum fractions, coumarone-indene resins, hydrogenated petroleum resins, modified petroleum resins, cyclopentadiene-based resins, thermoplastics, or a mixture thereof. Most preferably, the petroleum resin is a C5-C9 petroleum resin, a C9-petroleum resin, a C5-petroleum resin or a mixture thereof.

The natural resin is preferably selected from the group of rosin resins and terpene resins.

The Emulsion Comprising the Bituminous Binder

According to the present invention, it is preferred that emulsions according to WO 2009/113854 which include a bituminous binder having a penetration of less than $70 \cdot 10^{-1}$ mm according to ASTM D5-97 are excluded. More specifically, it is preferred that emulsions which include a bituminous binder having a penetration of less than $70 \cdot 10^{-1}$ mm according to ASTM D5-97 and Redicote® E9 fatty amine emulsifier are excluded. Even more specifically, it is preferred that the emulsions according to Examples 5, 6, 7 and 8 of non-prepublished patent application WO 2009/113854 are excluded. Most specifically, it is preferred that emulsions of the following compositions are excluded:

Emulsion having a water content of about 40 wt. % water which is prepared from 99.232 units of weight of water, 0.428 units of weight of a 30% hydrochloric acid solution, 0.24 units of weight of Redicote® E9 fatty amine emulsifier, 0.0 to 0.2 wt. % of a scleroglucan—food grade oil (1:2) mixture (prepared from Actigum® CS 6 having a scleroglucan content of about 83 wt. % and a food grade vegetable oil in a weight ratio of 1:2) and bitumen $20\text{-}30 \cdot 10^{-1}$ mm (ex-Total Dunkirk, France refinery);

Emulsion having a water content of about 40 wt. % water which is prepared from 99.232 units of weight of water, 0.428 units of weight of a 30% hydrochloric acid solution, 0.24 units of weight of Redicote® E9 fatty amine emulsifier, 0.0 to 0.2 wt. % of a scleroglucan—food grade oil (1:2) mixture (prepared from Actigum® CS 6 having a scleroglucan content of about 83 wt. % and a food grade vegetable oil in a weight ratio of 1:2) and bitumen 35-50 $10^{-1}$ mm (ex-Total Dunkirk, France refinery);

Emulsion having a breaking index (20° C.) of 114, a water content of 41.2 wt. % water and a pH of 2.4 which is prepared from water, hydrochloric acid solution, Redicote® E9 fatty amine emulsifier, 0.2 wt. % of a scleroglucan—food grade oil (1:2) mixture (prepared from Actigum® CS 6 having a scleroglucan content of about 83 wt. % and a food grade vegetable oil in a weight ratio of 1:2) and bitumen 40-60 $10^{-1}$ mm (ex-Total Antwerp Belgium refinery);

Emulsion having a breaking index (20° C.) of 103, a water content of 41.2 wt. % and a pH of 2.4 which is prepared from water, hydrochloric acid solution, Redicote® E9 fatty amine emulsifier, 0.2 wt. % of a scleroglucan—food grade oil (1:2) mixture (prepared from Actigum® CS 6 having a scleroglucan content of about 83 wt. % and a food grade vegetable oil in a weight ratio of 1:2) and bitumen 20-30 $10^{-1}$ mm (ex-Total Dunkirk, France refinery);

Emulsion having a breaking index (20° C.) of 112, a water content of 41.1 wt. % and a pH of 2.4 which is prepared from water, hydrochloric acid solution, Redicote® E9 fatty amine emulsifier, 0.2 wt. % of a scleroglucan—food grade oil (1:2) mixture (prepared from Actigum® CS 6 having a scleroglucan content of about 83 wt. % and a food grade vegetable oil in a weight ratio of 1:2) and bitumen 35-50 $10^{-1}$ mm (ex-Total Dunkirk, France refinery Emulsion having a breaking index of 116, a water content of 43.9 wt. % water and a pH of 2.2 which is prepared from water, hydrochloric acid solution, Redicote® E9 fatty amine emulsifier, 0.14 units of weight of a scleroglucan—food grade oil (1:2) mixture (prepared from Actigum® CS 6 having a scleroglucan content of about 83 wt. % and a food grade vegetable oil in a weight ratio of 1:2) and bitumen 40-60 $10^{-1}$ mm (ex-Total Antwerp Belgium refinery);

Emulsion having a breaking index of 114, a water content of 41.2 wt. % and a pH of 2.4 which is prepared from water, hydrochloric acid solution, Redicote® E9 fatty amine emulsifier, 0.14 units of weight of a scleroglucan—food grade oil (1:2) mixture (prepared from Actigum® CS 6 having a scleroglucan content of about 83 wt. % and a food grade vegetable oil in a weight ratio of 1:2) and bitumen 40-60 $10^{-1}$ mm (ex-Total Antwerp Belgium refinery);

Emulsion having a breaking index (20° C.) of 116, a water content of 39.8 wt. % and a pH of 2.2 which is prepared from water, hydrochloric acid solution, Redicote® E9 fatty amine emulsifier, 0.2 wt. % of a scleroglucan—food grade oil (1:2) mixture (prepared from Actigum® CS 6 having a scleroglucan content of about 83 wt. % and a food grade vegetable oil in a weight ratio of 1:2) and bitumen 10-20 $10^{-1}$ mm (ex-Total Dunkirk, France refinery);

Emulsion having a breaking index (20° C.) of 104, water content of 40.9 wt. % and a pH of 2.1 which is prepared from 10,000 l of water, hydrochloric acid solution, 0.24 wt. % of Redicote® E9 fatty amine emulsifier, 0.14 wt. % of a scleroglucan—food grade oil (1:2) mixture (prepared from 1 part by weight of Actigum® CS 6 having a scleroglucan content of about 83 wt. % and 2 parts by weight of Rapeseed oil) and bitumen 20-30 $10^{-1}$ mm (ex-Total Dunkirk, France refinery).

According to the present invention, it is preferred that the emulsion comprises about 25 to about 75 wt. % of an aqueous phase and about 75 to about 25 wt. % of an oil phase, based on the total weight of the emulsion. More preferably, the emulsion comprises about 25 to about 75 wt. % of an aqueous phase and about 75 to about 25 wt. % of an oil phase, based on the total weight of the emulsion. The oil phase essentially comprises the bituminous binder.

The amount of the (1→3)-β-D-glucan in the emulsion is preferably 0.0005 wt. % to 0.1 wt. %, based on the total weight of the emulsion, more preferably 0.0005 wt. % to 0.05 wt. %, even more preferably 0.0005 wt. % to 0.02 wt. %.

The amount of the cationic emulsifier in the emulsion is preferably 0.01 wt. % to 20.0 wt. %, more preferably 0.01 wt. % to 10.0 wt. %, even more preferably 0.01 wt. % to 5.0 wt. %, yet even more preferably 0.02 wt. % to 2.5 wt. % even yet more preferably 0.02 wt. % to 0.5 wt. % and in particular 0.02 to 0.2 wt. %, based on the total weight of the emulsion.

When present in the emulsions according to the present invention, the elastomer and/or the petroleum resin and/or the natural resin content is preferably 0.01 to 10.0 wt. %, more preferably 0.05 to 7.5 wt. %, of the elastomer and/or the petroleum resin and/or the natural resin, based on the total weight of the emulsion.

The bituminous emulsions according to the present invention are fast breaking and have excellent storage stabilities. Accordingly, the bituminous emulsions according to the present invention are characterized by a breaking index of 150 or less, preferably of 130 or less. A breaking index of 150 or less, preferably 130 or less, ensures in a sufficiently low breaking time of the emulsion when it is applied to a road surface, even under relatively humid and cold conditions which allows the use of such emulsions under less advantageous weather conditions.

In addition, the bituminous emulsions according to the present invention are characterized by a C-factor of 200 or less, preferably 150 or less and even more preferably 115 or less. The C-factor is defined herein as:

$$C\text{-factor} = \text{Penetration recovered binder } (10^{-1} \text{ mm}) \times (100 \times \text{Storage stability})^{3.5}$$

wherein the penetration is determined according to ASTM D5-97 and the storage stability is determined according to NEN-EN 12847. The storage stability is the difference between the water content of the aqueous phase and the oil phase formed after separation. The lower the value of the difference, the better the storage stability. The storage stability is often expressed in a percentage and then this value must be multiplied by 100%.

End-Uses

The emulsions according to the present applications are in particular useful in road coating applications such as chip less surface dressings and trackless tack coating compositions, water proofing compositions, flooring applications, bonding layers, impregnation layers, dense coated materials and semi-dense coated materials which are cold-cast or storable, slurry seals, micro-surfacing compositions and mortars.

The emulsions can be used in combination with a particulate material, in particular a particulate material having an average diameter of 3 mm or less, more preferably less than 2 mm. The average diameter of the particulate material is therefore preferably 3 mm or less, more preferably less than 2 mm. The average diameter is determined according to British Standard BS 63; a size of 3 mm equals a d/D of ¼ according to NEN-EN 13043 (cf. Shell Bitumen Handbook, 5$^{th}$ Ed., page 224, Table 11.2, 2003).

According to the present invention, the particulate material can be selected from the group consisting of aggregate material (e.g. chippings), rubber crumbs, fibres of e.g. vegetable origin, wood chips, waste biomass such as Empty Fruit Bunch, and mixtures thereof. The present invention therefore also relates to a composition comprising a particulate material and an emulsion according to the invention. The composition is in particular a waterproofing chipless asphalt top seal composition.

The present invention also relates to a process for chip sealing a road surface, wherein an emulsion according to the present invention is applied to said road surface.

The present invention also relates to a process for chip sealing a road surface, wherein an emulsion according to the present invention is applied to said road surface followed by embedding a particulate material, wherein said emulsion comprises a (1→3)-β-D-glucan, a cationic emulsifier, and a bituminous binder having a penetration of less than 70 $10^{-1}$ mm according to ASTM D5-97.

EXAMPLES

Example 1

A scleroglucan (Actigum® CS 6 purchased from Cargill, France; scleroglucan content about 83 wt. %) mixture with a food grade vegetable oil (purchased from Mosselman N.V., Belgium, or Heybroek B.V., the Netherlands) was prepared by mixing the two components at room temperature in a weight ratio of 1:2. The food grade vegetable oil is protecting the scleroglucan particles to conglomerate in an aqueous medium and, hence, a homogenous dispersion is obtained when this mixture is added to water whilst stirring. Emulsions were produced according the following procedure. To 99.009 units of weight of water at a temperature of about 60° C., 0.467 units of weight of a 30% hydrochloric acid solution was added whilst gently stirring. After the addition of 0.324 units of weight of Redicote® E9 fatty amine emulsifier (purchased from Akzo Nobel) to the water, 0.2 units of weight of the scleroglucan-food grade oil (1:2) mixture was added. Both the water and a hard bitumen, i.e. Total bitumen with a penetration ranging from 20-30 $10^{-1}$ mm (Total refinery Dunkirk) were fed to an emulsion mill (a Trigonal Mill obtained from Siefer Machinenfabrik GmbH & Co KG) and were emulsified to an oil in water (O/W) emulsion having a water content of about 41 wt. % water. The storage stability was determined after seven days. The compositions and properties of the emulsions are summarised in Table 1.

TABLE 1

| Water content (%) | NEN-EN 1428 | 41 |
| Sieve residue | NEN-EN 1429 | <0.1 |
| Settling tendency (7 days @ 20° C.) | NEN-EN 12847 | 0.001 |
| pH | NEN-EN 12850 | 1.9 |
| Efflux time (ISO 4 @ 25 is sec) | NEN-EN 3947 | 37 |
| Breaking index (25° C.) | NEN-EN 13075-1 | 124 |
| Needle penetration of the recovered binder (mm/10) | NEN-EN 1426[a] | 25 |
| Volume average particle size (μm) | | 6.7 |
| Volume fraction of particle >8 μm | | 25 |
| C-factor | | 0.0079 |

[a]Equivalent to ASTM D5-97.

Example 2

A Sasobit wax (purchased from Sasol, South Africa) modified bitumen with a penetration ranging from 20-30 $10^{-1}$ mm (Total refinery Dunkirk) was emulsified using the same procedure as in Example 1. The wax content used was 5 wt. %, based on the bituminous binder; additionally, the emulsifier content was 0.45 wt % (in the soap phase). The storage stability of the emulsion was determined after seven days. The compositions and properties of the emulsions are summarised in Table 2.

TABLE 2

| Water content (%) | NEN-EN 1428 | 43.6 |
| Sieve residue | NEN-EN 1429 | <0.1 |
| Settling tendency (7 days @ 20° C.) | NEN-EN 12847 | 0.005 |
| pH | NEN-EN 12850 | 2.3 |
| Efflux time (ISO 4 @ 25 is sec) | NEN-EN 3947 | 47 |
| Breaking index (25° C.) | NEN-EN 13075-1 | 102 |
| Needle penetration of the recovered binder (mm/10) | NEN-EN 1426[a] | 12 |
| Volume average particle size (μm) | | 6.2 |
| Volume fraction of particle >8 μm | | 17 |
| C-factor | | 1.06 |

[a]Equivalent to ASTM D5-97.

Example 3

A scleroglucan mixture with a food grade vegetable oil was prepared as in Example 1. Emulsions were produced according the following procedure. To 97.82 units of weight of water at a temperature of about 60° C., 0.94 units of weight of a 30% hydrochloric acid solution was added whilst gently stirring. After the addition of 1.1 units of weight of Emulsamine 640 alkyl di-amine emulsifier (purchased from Ceca, France) to the water, 0.14 units of weight of the scleroglucan-food grade oil (1:2) mixture was added. The Nynas bitumen with a penetration ranging from 70-100 $10^{-1}$ mm (Nynas refinery Antwerp) was modified with 4% of a linear triblock SBS copolymer (Kraton D-1192 ES). Both the water and the bitumen were fed to an emulsion mill (a Trigonal Mill obtained from Siefer Machinenfabrik GmbH & Co KG) and were emulsified to an oil in water (O/W) emulsion having a water content of about 41 wt. % water. The storage stability was determined after seven days. The compositions and properties of the emulsions are summarised in Table 3.

TABLE 3

| Water content (%) | NEN-EN 1428 | 40.9 |
| Sieve residue | NEN-EN 1429 | <0.1 |
| Settling tendency (7 days @ 20° C.) | NEN-EN 12847 | 0.008 |
| pH | NEN-EN 12850 | 2.1 |
| Efflux time (ISO 4 @ 25 is sec) | NEN-EN 3947 | 34 |
| Breaking index (25° C.) | NEN-EN 13075-1 | 93 |
| Needle penetration of the recovered binder (mm/10) | NEN-EN 1426[a] | 56 |
| Volume average particle size (μm) | | 13 |
| Volume fraction of particle >8 μm | | 39 |
| C-factor | | 25.64 |

[a]Equivalent to ASTM D5-97.

The invention claimed is:

1. An emulsion, comprising:
    about 0.0005 wt % to about 0.1 wt % of a non-modified scleroglucan, based on the total weight of the emulsion;
    a cationic emulsifier; and
    a bituminous binder having a penetration of less than 70 $10^{-1}$ mm, as determined according to ASTM D5-97, wherein the emulsion has a breaking index of 150 or less at 25° C., as determined according to NEN-EN 13075-1,
wherein the emulsion has a C-factor of 200 or less, wherein the C-factor is defined as:

$$C\text{-factor}=\text{penetration of recovered binder}\times(100\times\text{storage stability})^{3.5},$$

wherein the penetration of recovered binder is determined according to ASTM D5-97, and
wherein the storage stability is determined according to NEN-EN 12847.

2. The emulsion according to claim 1, wherein the emulsion comprises about 25 wt % to about 75 wt % of an aqueous phase and about 75 wt % to about 25 wt % of an oil phase, based on the total weight of the emulsion.

3. The emulsion according to claim 1, wherein the bituminous binder comprises bitumen, a petroleum resin, or a combination thereof.

4. The emulsion according to claim 1, wherein the bituminous binder comprises a blend of a soft bitumen having a penetration of greater than 100 $10^{-1}$ mm, as determined according to ASTM D5-97, and a hard bitumen having a penetration of 100 $10^{-1}$ mm or less, as determined according to ASTM D5-97, and wherein a weight ratio of the soft bitumen to the hard bitumen is about 1 to about 30.

5. The emulsion according to claim 1, wherein the cationic emulsifier is selected from the group consisting of: quaternary amines, quaternary amino-amines, quaternary imidazolines, and biodegradable emulsifiers.

6. The emulsion according to claim 1, wherein the emulsion further comprises an elastomer, a petroleum resin, a natural resin, or any combination thereof.

7. The emulsion according to claim 6, wherein the elastomer is present and selected from the group consisting of: ethylene-vinyl acetate copolymers, polybutadienes, polyisoprenes, ethylene-propylene copolymers, ethylene-propylene-diene copolymers, styrene-ethylene-butadiene-styrene copolymers, styrene-propylene-butadiene-styrene copolymers, butadiene-styrene diblock copolymers, styrene-butadiene-styrene triblock copolymers, isoprene-styrene diblock copolymers, styrene-isoprene-styrene triblock copolymers, and mixtures thereof.

8. The emulsion according to claim 6, wherein the petroleum resin is present and selected from the group consisting of: resins manufactured by polymerisation of unsaturated hydrocarbons present in unsaturated petroleum fractions, coumarone-indene resins, hydrogenated petroleum resins, modified petroleum resins, cyclopentadiene-based resins, thermoplastics, and mixtures thereof.

9. The emulsion according to claim 6, wherein the natural resin is present and selected from the group consisting of: rosin resins and terpene resins.

10. The emulsion according to claim 1, wherein the emulsion has a breaking index of 130 or less at 25° C., as determined according to NEN-EN 13075-1.

11. The emulsion according to claim 1, wherein the emulsion further comprises a particulate material selected from the group consisting of: aggregate material, fibers, wood chips, and any mixture thereof, and wherein the emulsion comprises about 0.0005 wt % to about 0.02 wt % of the non-modified scleroglucan, based on the total weight of the emulsion.

12. A composition, comprising:
a particulate material; and
an emulsion, the emulsion comprising:
about 0.0005 wt % to about 0.1 wt % of a non-modified scleroglucan, based on the total weight of the emulsion,
a cationic emulsifier, and
a bituminous binder having a penetration of less than 70 $10^{-1}$ mm, as determined according to ASTM D5-97,
wherein the emulsion has a breaking index of 150 or less at 25° C., as determined according to NEN-EN 13075-1,
wherein the emulsion has a C-factor of 200 or less, wherein the C-factor is defined as:

$$C\text{-factor}=\text{penetration of recovered binder}\times(100\times\text{storage stability})^{3.5},$$

wherein the penetration of recovered binder is determined according to ASTM D5-97, and
wherein the storage stability is determined according to NEN-EN 12847.

13. The composition according to claim 12, wherein the particulate material has an average diameter of 3 mm or less, as determined according to British Standard BS 63.

14. The composition according to claim 12, wherein the particulate material is selected from the group consisting of: aggregate material, fibers, wood chips, and any mixture thereof, and wherein the emulsion comprises about 0.0005 wt % to about 0.02 wt % of the non-modified scleroglucan, based on the total weight of the emulsion.

15. The composition according to claim 12, wherein the bituminous binder comprises a blend of a soft bitumen having a penetration of greater than 100 $10^{-1}$ mm, as determined according to ASTM D5-97, and a hard bitumen having a penetration of 100 $10^{-1}$ mm or less, as determined according to ASTM D5-97, and wherein a weight ratio of the soft bitumen to the hard bitumen is about 1 to about 30.

16. A process for chip sealing a road surface, comprising:
applying an emulsion to a road surface, the emulsion comprising:
about 0.0005 wt % to about 0.1 wt % of a non-modified scleroglucan, based on the total weight of the emulsion,
a cationic emulsifier, and
a bituminous binder having a penetration of less than 70 $10^{-1}$ mm, as determined according to ASTM D5-97,
wherein the emulsion has a breaking index of 150 or less at 25° C., as determined according to NEN-EN 13075-1,
wherein the emulsion has a C-factor of 200 or less, wherein the C-factor is defined as:

$$C\text{-factor}=\text{penetration of recovered binder}\times(100\times\text{storage stability})^{3.5},$$

wherein the penetration of recovered binder is determined according to ASTM D5-97, and
wherein the storage stability is determined according to NEN-EN 12847.

17. The process according to claim 16, wherein the emulsion further comprises a particulate material.

18. The process according to claim 17, wherein the particulate material has an average diameter of 3 mm or less, as determined according to British Standard BS 63.

19. The process according to claim 17, wherein the particulate material is selected from the group consisting of: aggregate material, fibers, wood chips, and any mixture thereof, and wherein the emulsion comprises about 0.0005 wt % to about 0.02 wt % of the non-modified scleroglucan, based on the total weight of the emulsion.

20. The process according to claim 17, wherein the bituminous binder comprises a blend of a soft bitumen having a penetration of greater than 100 $10^{-1}$ mm, as determined according to ASTM D5-97, and a hard bitumen having a penetration of 100 $10^{-1}$ mm or less, as determined according to ASTM D5-97, and wherein a weight ratio of the soft bitumen to the hard bitumen is about 1 to about 30.

* * * * *